(12) United States Patent
Fitzgerald

(10) Patent No.: US 7,735,812 B2
(45) Date of Patent: Jun. 15, 2010

(54) VIBRATION-DAMPING DEVICE

(75) Inventor: Dermot James Fitzgerald, Fermoy (IE)

(73) Assignee: Trelleborg AB, Trelleborg (SE)

( * ) Notice: Subject to any disclaimer, the term of this patent is extended or adjusted under 35 U.S.C. 154(b) by 1233 days.

(21) Appl. No.: 10/554,813

(22) PCT Filed: Apr. 23, 2004

(86) PCT No.: PCT/GB2004/001748

§ 371 (c)(1),
(2), (4) Date: Oct. 27, 2005

(87) PCT Pub. No.: WO2004/097246

PCT Pub. Date: Nov. 11, 2004

(65) Prior Publication Data

US 2006/0202400 A1    Sep. 14, 2006

Related U.S. Application Data

(60) Provisional application No. 60/486,203, filed on Jul. 8, 2003.

(30) Foreign Application Priority Data

Apr. 30, 2003    (GB) ................................. 0309797.9

(51) Int. Cl.
*B62D 33/06* (2006.01)
(52) U.S. Cl. ........................................ 267/293; 267/141
(58) Field of Classification Search ................. 267/292, 267/293, 141, 141.1; 296/190.07
See application file for complete search history.

(56) References Cited

U.S. PATENT DOCUMENTS 2,958,526 A * 11/1960 Ulderup et al. ............. 267/292

| 4,213,718 A | 7/1980 | Lumby |
| 4,252,339 A | 2/1981 | Shimizu et al. |
| 4,771,990 A * | 9/1988 | Domer et al. .......... 267/140.12 |
| 5,080,335 A | 1/1992 | Solleder et al. |

(Continued)

FOREIGN PATENT DOCUMENTS

DE    1645939    10/1952

(Continued)

OTHER PUBLICATIONS

International Search Report May 8, 2004; International Application No. PCT/GB2004/001748.

(Continued)

*Primary Examiner*—Bradley T King
(74) *Attorney, Agent, or Firm*—Edwards Angell Palmer & Dodge LLP

(57) ABSTRACT

A vibration damping device (10) comprising an axisymmetric elastomeric body (20), which has a base side (40), a periphery (50), and a through hole (60). The body comprises an integrally bonded cup-shaped axisymmetric structure (70), which has a base portion (80), a side wall (90), and an opening (100) encompassing the through hole. The base portion and the side wall adjoin to the base side and periphery, respectively. The elastomeric body has a groove (110) encompassed by the side wall, which groove extends along and close to the periphery, and is adapted to receive a separately provided axisymmetric snubber member. A vibration damper assembly comprising two vibration-damping devices of said kind.

21 Claims, 4 Drawing Sheets

U.S. PATENT DOCUMENTS

| | | | | |
|---|---|---|---|---|
| 5,489,087 A | * | 2/1996 | Bitschkus | 267/141 |
| 5,516,176 A | * | 5/1996 | Kimoto et al. | 296/35.1 |
| 5,743,509 A | | 4/1998 | Kanda et al. | |
| 6,845,994 B2 | * | 1/2005 | Cai et al. | 280/124.107 |
| 7,246,797 B2 | * | 7/2007 | Gustavsson | 267/141.4 |
| 7,478,803 B2 | * | 1/2009 | Lee | 267/293 |

FOREIGN PATENT DOCUMENTS

| | | |
|---|---|---|
| DE | 1 525 131 | 10/1969 |
| FR | 2 827 931 A1 | 1/2003 |
| GB | 2 037 398 A | 7/1980 |
| GB | 2 060 812 A | 5/1981 |
| JP | 07332417 | 12/1995 |
| JP | 2003065388 | 3/2003 |
| JP | 2003269509 | 9/2003 |
| WO | WO-99/51482 | 10/1999 |

OTHER PUBLICATIONS

Written Opinion of the International Searching Authority May 8, 2004; International Application No. PCT/GB2004/001748.

* cited by examiner

VIBRATION-DAMPING DEVICE

The present invention relates to a vibration damping device and a vibration damper assembly comprising such a device, in particular such a vibration-damping device and system for engine and cab mounts, especially for use in off-road vehicles.

Off-road vehicles and particularly engines thereof are subjected to stress in terms of shocks and vibrations. Normally, means are disposed to minimize shocks from a chassis to an engine and to minimize vibrations from an engine to a chassis. Vibration dampers serve for connecting e.g. a cab structure to a vehicle main frame and to diminish vibrations between them. Other applications of vibration dampers comprise the mounting of engines to the vehicle frame with attendant reduction of detrimental vibrations between the vehicle frame and the engine due to the vibration damper. Vibration dampers are also of use in stationary applications such as in compressors, pumps and generators. Furthermore, moving vehicles such as automobiles, trucks, aircraft, missiles, ships and rail vehicles carry components that require protection against severe shocks. One function of a vibration damper is to provide a means whereby a component is protected against handling impact loads being transmitted from a further component Storing energy within a resilient medium and then releasing such energy at a relatively slower rate usually accomplish protection against such loads. Generally, such dampers comprise an elastomeric member, which, together with the mass of the mechanism, which it supports, has a natural frequency that is sufficiently lower from that of the disturbing force to bring about a minimum transient response of the supported mechanism, and yet have sufficient static load-carrying capacity to support the load of such mechanism. Correct matching of a vibration damper to specific application is essential; e.g., a given vibration damper may be effective in a case where the mechanism is to be subjected to a relatively high magnitude of loading within a short time interval and yet may tend to magnify the shocks where the mechanism is to be subjected to a loading of considerably smaller magnitude but with a longer time interval. In many applications, the vibration dampers will experience all the modes of loading or combinations thereof. In particular, the vibration damper will not only have to support the protected component, but will also have to hold it to the structure wherein the vibration damper is in tension or help the protected component from shifting wherein the vibration damper is in shear.

This invention is generally directed to the case wherein various types of loads including compression, shear or tension modes and shocks and vibrations or combinations thereof are incurred by the vibration damper. It would be advantageous to have one mount design that could simultaneously accommodate all possible modes of loads. In would be particularly desirably to provide a vibration-damping device with easily adjustable allowed amount of movement and stiffness characteristics.

U.S. Pat. No. 4,252,339 relates to a vibration preventive rubber device for automobiles comprising a pair of cylindrical rubber bodies each of which has a low spring constant and is provided at its centre with a circumferentially extending annular groove and provided at least one side of the annular groove with an annular laminated body having a high rigidity and including a canvas layer and a rubber body. It is said that any desired spring characteristic can be obtained by adjusting the number of canvas layers of the laminated body.

However, as the unbonded surfaces allow sliding of the rubber over the metal, as seen in FIG. 4 in U.S. Pat. No. 4,252,339, the friction would be inconsistent due to environmental conditions, e.g. moisture present, which makes the stiffness characteristics inconsistent. The unbonded surfaces also allow wear and damage to occur on the rubber surface so reducing the life of the part Furthermore, as illustrated by curve B in FIG. 5., the stiffness curve is non-linear in the working load range. A constant linear stiffness curve in the working load range would be desirable, as this would make it easy to predict the vibration isolation performance of the mount. By moulding different laminated layers into the middle of the moulded rubber part (FIG. 7 in U.S. Pat. No. 4,252,339) with the same outside geometry, the parts look identical when moulded, but have different stiffness characteristics when used. This is apt to lead to difficulties in identifying parts, as the part would have to be cut it in half in order to see what type of laminated layer was inside.

The problem to be solved by the present invention is to provide a vibration-damping device by which the above disadvantages are overcome.

This problem is solved by means of the vibration-damping device, one embodiment of which is defined by appended Claim 1. More particular, this embodiment relates to a vibration damping device comprising an elastomeric body which is axisymmetric about an axis, which is preferably straight, said body having a base side and a periphery, said body having a through hole coaxial with said axis, and comprising an integrally bonded cup-shaped structure, which is also axisymmetric and coaxial with said axis, said structure having a base portion, a side wall, and an opening coaxial with said axis and encompassing the circumference of said through hole, said base portion and side wall adjoining to said base side and periphery, respectively, which elastomeric body has a groove encompassed by said side wall and extending coaxial with said axis along and close to said periphery, which groove is adapted to receive a separately provided rotation symmetrical snubber member.

The inventive vibration-damping device is intended to be used with an axisymmetric snubber member inserted in the groove in the elastomeric body, in order to vary the stiffness characteristics of the vibration-damping device.

Preferably, said elastomeric body and said cup-shaped structure have circular cross-section in the plane perpendicular to said axis. Consequently, said snubber member is preferably annular or ring-shaped. The outer surface of the cupped structure is encapsulated in the elastomer matrix, which prevents metal corrosion.

The elastomeric body may be made of rubber, such as for instance natural rubber (NR), styrenebutadiene rubber (SBR), EPDM, chloroprene (CH, CR), nitrile rubber (NBR), silicone rubber, or some combination thereof.

The cup-shaped structure may be made of any suitable metallic or plastic material, such as for instance steel, aluminium alloy, structural plastic such as nylon, glass fibre or mineral filled nylon.

The snubber member may be made of plastic, such as for instance nylon (polyamide), glass fibre or mineral filled nylon, polyurethane, high-density polyethylene, high density polypropylene, acrylic plastics, a silicone polymer, or some combination thereof.

The present invention may be provided as a kit-of-parts or a system for vibration damping comprising a vibration damping device according as set out above and one or more plastic rotation symmetrical member(s) adapted to be received by the groove in the elastomeric body, each plastic rotation symmetrical member being designed to vary the stiffness characteristics of the vibration damping device when inserted in the groove.

The present vibration damping device is preferably used in a vibration damper assembly comprising two vibration damping devices a set out above, which vibration damping devices are both provided with flanges protruding from the respective base sides, which flanges confront each other in a hole of a bracket while the respective base sides bear on either side of said bracket; a bolt or threaded stud extends through the holes of said vibration damping devices; and said vibration damping devices are sandwiched between washers and secured to said bracket by means of lock nuts threaded onto the said bolt or threaded stud.

Vibration damping devices of the present invention comprising elastomeric bodies of one and the same kind, i.e. having bodies made of the same elastomer/elastomeric compound, may easily be adjusted to various amounts of allowed movement as well as different stiffness characteristics by inserting various snubber members in the grooves of the bodies.

The addition of a snubber member into said groove provides a way of changing the load at which vertical 'snubbing' takes place, i.e. at which the mount will deflect with a rapidly increasing non-linear stiffness; this is sometimes referred to as 'buffering'. The geometry of the snubber member can also change the rate at which the transition to a rapidly increasing non-linear stiffness takes place. Using snubber members of different thickness and/or geometry provides the means of adjusting the snubbing and stiffness characteristics of the device/system.

The snubber members can be colour coded to give quick and easily accessible information about the altered snubbing and stiffness characteristics provided by the snubber member. In fact, such colour coded snubber members may give quicker and more easily accessible information about the snubbing and stiffness characteristics of the device/system per se, in relation to conventional vibration damper systems mainly comprising rubber, which are generally black irrespective of the modulus of elasticity of the particular rubber compound used.

By using the inventive concept of the addition of different snubber members to control stiffness characteristics rather than having a large number of different vibration dampers with elastomer bodies of different modulus of elasticity, the same kind of vibration damping device can be produced for great variety of applications. This has obvious cost and manufacturing advantages, as a small number of different moulded parts could be used on a large number of different applications with the addition of the correct colour coded snubber member. Each snubber member would have different geometry to control the stiffness characteristics of the device, and the snubber members are easily pressed into the device.

The present invention provides vibration isolation and multi-directional shock protection, as well as means for controlling movement of the structure, to which the device/assembly is applied to, in all directions to within acceptable limits.

The present vibration damping device and vibration damper assembly has a constant linear stiffness curve in the static working load range, which helps to predict the vibration isolation performance of the device/assembly, as the stiffness of the device/assembly is constant for different load cases.

Further objects and advantages of the invention will be understood from the following detailed description with reference to the accompanying drawings, in which:

BRIEF DESCRIPTION OF THE DRAWINGS

Referring to FIG. 1, there is shown one embodiment of a vibration damping elastomeric device according to the present invention. The vibration-damping device 10 comprises a resilient rubber body 20. In the specific illustrated case, the rubber material is a natural rubber compound. Rubber body 20 is circular about an axis 30 and has a central through hole 60, which is the internal diameter of a metal tube 65 bonded to the rubber body 20. Metal tube 65 may be made of, for instance, cold drawn steel, machined steel, or sintered steel. A circular cupped flange structure 70 made of steel is embraced by and bonded to the rubber matrix of body 20. Rubber body 20 and flange structure 70 are coaxial with respect to axis 30. Likewise, the opening 100 of flange structure 70 is coaxial with through hole 60. The base portion 80 and the side wall 90 of flange structure 70 adjoin closely to the base side 40 and the periphery 50, respectively, of rubber body 20. The body 20 has a groove 110 encompassed by side wall 90, which groove extends along and close to said periphery 50. The groove 110 is adapted to receive a separately provided annular plastic member (not shown). The rim 120 is designed to engage with the walls of a mounting hole in a bracket during assembly of a vibration damper assembly according to the invention. This temporarily secures the vibration damping devices in the hole before the damping devices are secured to the bracket by a bolt, washers, and lock nut.

In FIG. 3, the vibration damper assembly comprises two inventive vibration damping devices 130 and 140, which are both provided with flanges 150 and 160 protruding from the respective base sides. The flanges 150 and 160 containing the bonded metal tubes 260 and 270 confront each other in a mounting hole 170 of a mounting bracket 180, in the illustrated embodiment a part of a vehicle chassis. The base sides of the vibration damping devices 130 and 140 bear on either side of mounting bracket 180. A bolt 190 extends through the holes of the vibration damping devices, which are sandwiched between washers 200, 210, and secured to mounting bracket 180 by means of lock nut 220, which is threaded onto the bolt 190. The assembly is secured to an engine bracket 280, which is sandwiched between washer 200 and a further washer 290. In the illustrated embodiment, the lower vibration-damping device 140 is equipped with a plastic snubber member 240 inserted in groove 250. During vertical loading of the assembly, the cupped flange structures included in the respective vibration damping devices 130 and 140 and the washers 200 and 210 constrain the bulging of the respective resilient rubber bodies. This provides vertical snubbing of the mount so limiting the vertical movement of the mounted equipment. Horizontal equipment movement is limited by the assembly of the bolt 190, the metal tubes 260, 270 and the bonded rubber flanges 150 and 160 coming into contact with the inside diameter of the rubber surface coating the cupped flange structure 70.

Figure 1:
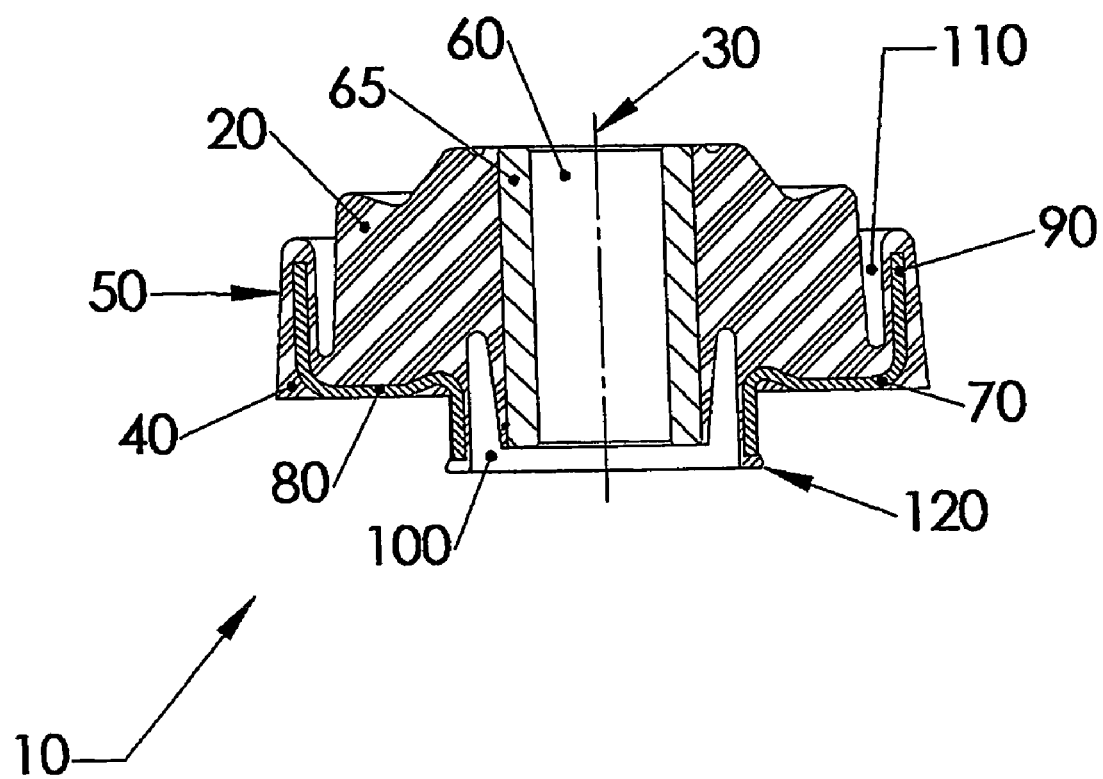
FIG. 1 is a cross-sectional view of one embodiment of a vibration-damping device according to the invention.
Figure 2:
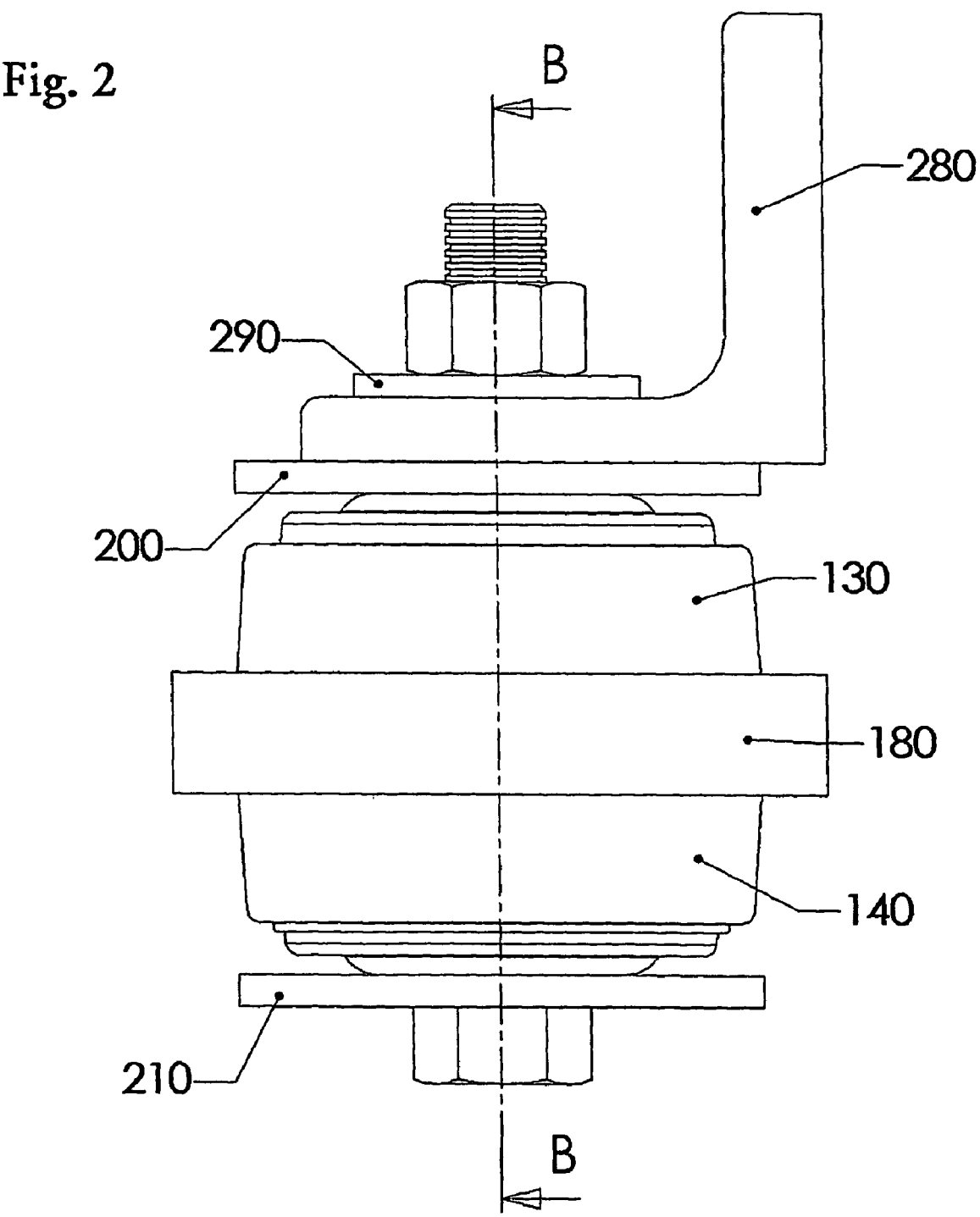
FIG. 2 shows one embodiment of the inventive vibration damper assembly, which system comprises two vibration-damping devices of the kind shown in FIG. 1.
Figure 3:
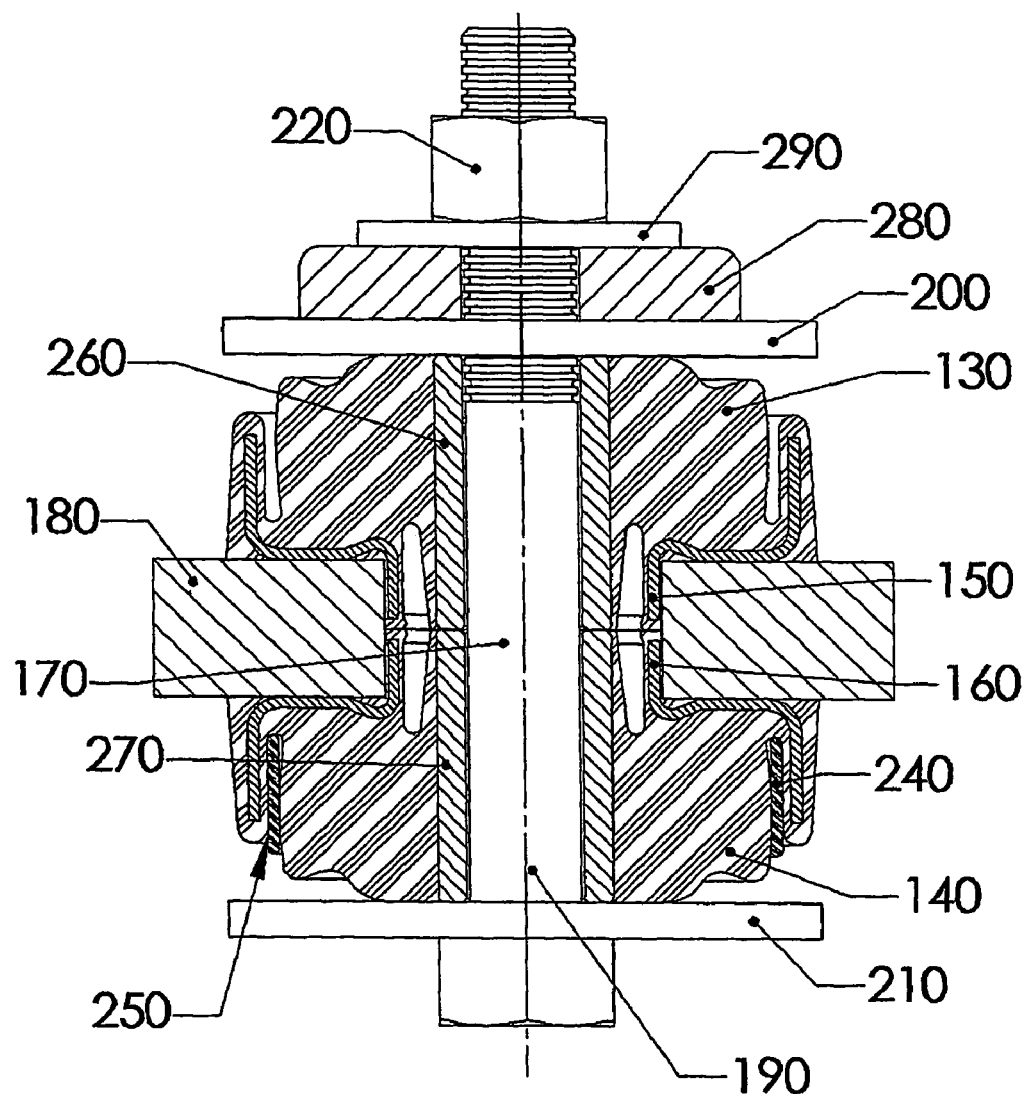
FIG. 3 is a cross-sectional view of the vibration damper assembly in FIG. 2 seen along the section line A-A.
Figure 4:
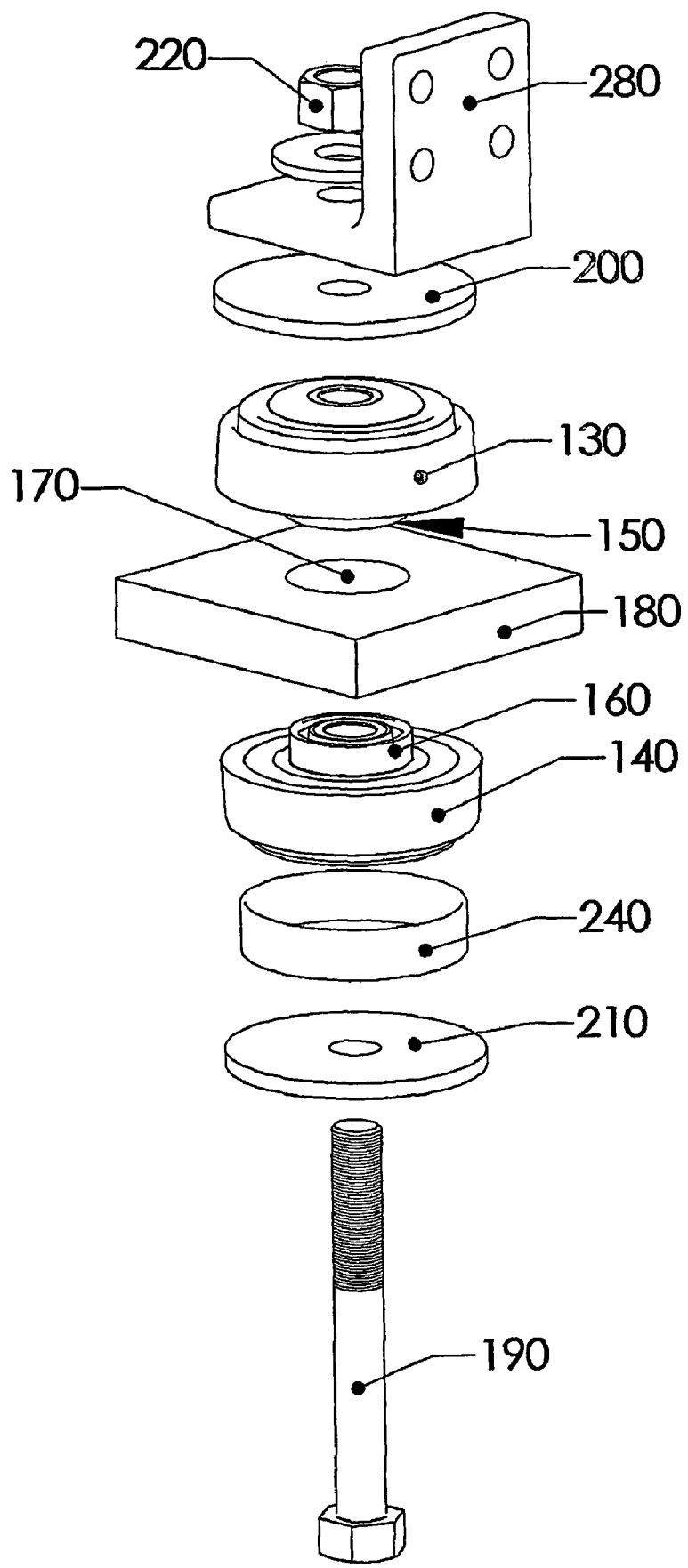
FIG. 4 is an exploded view of the vibration damper assembly in FIG. 2.

Although the present invention is developed to be used primarily in mounting systems for off-highway vehicles, there are many possible applications of the inventive device and assembly for mounting equipment in many other mobile industries such as rail, marine and on-highway vehicles.

The invention claimed is:

1. A kit of parts for vibration damping comprising:
   a vibration damping device having:
   a rim for engaging with walls of a mounting hole;
   an elastomeric body which is axisymmetric about an axis, said body extending radially outwardly of said rim to a periphery and having a base side, said body having a through hole coaxial with said axis; and
   an integrally bonded cup-shaped axisymmetric structure coaxial with said axis, said structure having a base portion adjoining the base side of said elastomeric body, a side wall adjoining the periphery of said elastomeric body, and an opening coaxial with said axis and encompassing the circumference of said through hole,
   wherein said elastomeric body has a groove encompassed by said side wall and extending coaxial with said axis and closer to said periphery than to said through hole; and
   one or more snubber member(s) adapted to be received by the groove in the elastomeric body, each snubber member being designed to vary the stiffness characteristics of the vibration damping device when inserted in the groove.

2. The kit of parts for vibration damping of claim 1, wherein the snubber member is made of a plastics material.

3. The kit of parts for vibration damping of claim 2, wherein the plastics material is selected from a group comprising nylon (polyamide), glass fibre filled nylon, mineral filled nylon, plyurethane, high-density polyethylene, high density polypropylene, acrylic plastics, a silicone polymer, and any combination thereof.

4. The kit of parts for vibration damping of claim 1, wherein the snubber members are colour coded to give quick and easily accessible information about the snubbing and stiffness characteristics provided by the snubber member.

5. The kit of parts for vibration damping of claim 1, comprising a plurality of snubber members of different thickness for adjusting the snubbing and stiffness characteristics.

6. The kit of parts for vibration damping of claim 1 comprising a plurality of snubber members of different geometry for adjusting the snubbing and stiffness characteristics.

7. A vibration damping system comprising:
   a vibration damping device having:
   a rim for engaging with walls of a mounting hole;
   an elastomeric body which is axisymmetric about an axis, said body extending radially outwardly of said rim to a periphery and having a base side, said body having a through hole coaxial with said axis; and
   an integrally bonded cup-shaped axisymmetric structure coaxial with said axis, said structure having a base portion adjoining the base side of said elastomeric body, a side wall adjoining the periphery of said elastomeric body, and an opening coaxial with said axis and encompassing the circumference of said through hole,
   wherein said elastomeric body has a groove encompassed by said side wall and extending coaxial with said axis along and closer to said periphery than to said through hole; and
   one or more snubber member(s) adapted to be received by the groove in the elastomeric body, each snubber member varying the stiffness characteristics of the vibration damping device when inserted in the groove.

8. The vibration damping system of claim 7, wherein said elastomeric body and said cup-shaped structure have circular cross-sections in the plane perpendicular to said axis, and said snubber member is annular.

9. The vibration damping system of claim 8, wherein the outer surface of the cup-shaped structure is encapsulated in the elastomeric body, which prevents metal corrosion.

10. The vibration damping system of claim 9, wherein the elastomeric body is made of rubber.

11. The vibration damping system of claim 10, wherein the rubber is selected from a group comprising natural rubber (NR), styrene-butadiene rubber (SBR), EPDM, chloroprene (CH, CR), nitrile rubber (NBR), silicone rubber, and any combination thereof.

12. The vibration damping system of claim 7, wherein the cup-shaped structure is made of a metallic material.

13. The vibration damping system of claim 12, wherein the metallic material is selected from steel and aluminium alloy.

14. The vibration damping system of claim 7, wherein the cup-shaped structure is made of a plastics material.

15. The vibration damping system of claim 14, wherein the plastic material is a structural plastic.

16. The vibration damping system of claim 15, wherein the structural plastic is selected from a group comprising nylon, glass fibre and mineral filled nylon.

17. The vibration damping system of claim 7, wherein the snubber member is made of a plastics material.

18. The vibration damping system of claim 17, wherein the plastics material is selected from a group comprising nylon (polyamide), glass fibre filled nylon, mineral filled nylon, plyurethane, high-density polyethylene, high density polypropylene, acrylic plastics, a silicone polymer, and any combination thereof.

19. The vibration damping system of claim 7, wherein the snubber members are colour coded to give quick and easily accessible information about the snubbing and stiffness characteristics provided by the snubber member.

20. The vibration damping system of claim 7, comprising a plurality of snubber members of different thickness for adjusting the snubbing and stiffness characteristics.

21. The vibration damping system of claim 7 comprising a plurality of snubber members of different geometry for adjusting the snubbing and stiffness characteristics.

* * * * *